(12) United States Patent
Tokuchi

(10) Patent No.: US 10,812,436 B2
(45) Date of Patent: Oct. 20, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 44 days.

(21) Appl. No.: 15/965,987

(22) Filed: Apr. 30, 2018

(65) Prior Publication Data
US 2019/0166080 A1 May 30, 2019

(30) Foreign Application Priority Data
Nov. 27, 2017 (JP) ................................. 2017-226809

(51) Int. Cl.
*G06F 15/16* (2006.01)
*H04L 12/58* (2006.01)

(52) U.S. Cl.
CPC .............. *H04L 51/24* (2013.01); *H04L 51/04* (2013.01)

(58) Field of Classification Search
CPC ................................ H04L 51/24; H04L 51/04
USPC ................................................. 709/206, 224
See application file for complete search history.

(56) References Cited

U.S. PATENT DOCUMENTS

| | | | | |
|---|---|---|---|---|
| 6,192,037 | B1* | 2/2001 | Spear | H04W 36/12 370/315 |
| 7,426,687 | B1* | 9/2008 | Schultz | G06F 16/9566 715/208 |
| 7,984,500 | B1* | 7/2011 | Khanna | G06F 21/552 709/225 |
| 10,069,865 | B2* | 9/2018 | Xavier | G06F 21/562 |
| 2007/0112814 | A1* | 5/2007 | Cheshire | H04L 63/1483 |
| 2011/0314546 | A1* | 12/2011 | Aziz | G06F 21/56 726/24 |
| 2013/0124687 | A1* | 5/2013 | Nam | H04L 63/1483 709/218 |
| 2013/0318177 | A1* | 11/2013 | Tan | H04L 51/28 709/206 |
| 2014/0041055 | A1* | 2/2014 | Shaffer | G06Q 10/10 726/28 |
| 2016/0014151 | A1* | 1/2016 | Prakash | H04L 63/1483 726/22 |
| 2018/0063190 | A1* | 3/2018 | Wright | H04L 63/168 |
| 2018/0084008 | A1* | 3/2018 | Turuvekere Nataraja | H04L 63/1483 |
| 2018/0115584 | A1* | 4/2018 | Alhumaisan | H04L 63/1483 |

FOREIGN PATENT DOCUMENTS

JP 2014513834 6/2014

* cited by examiner

*Primary Examiner* — Liang Che A Wang
(74) *Attorney, Agent, or Firm* — JCIPRNET

(57) ABSTRACT

An information processing apparatus includes a notification unit that notifies that a received message has changed after reception or browsing of the message. In a further modification of the invention, the message may include a character string for guide to another link destination, and transfer to the link destination having undergone a change may be disabled.

8 Claims, 17 Drawing Sheets

| | |
|---|---|
| Date : | Fri,29 Sep 2017 11:11:11 |
| From: | aaa@bbb.co.jp |
| To: | xxx@yyy.co.jp |
| Subject: | Invitation |

Hello http://Kiken.com
Please access.

1605 — Date
1610 — From
1615 — To
1620 — Subject
1625 — Body

1630:
(1) E-MAIL SENDER: AAA@BBB.CO.JP
SENT DATE/TIME: Fri, 29 Sep 2017 11:11:11
BEFORE CHANGE: http://Kiken.Com
AFTER CHANGE: http://Anzen.Com
(2) E-MAIL SENDER: SPEAKER 1
SENT DATE/TIME: Sat, 26 Aug 2017 20:37
BEFORE CHANGE: http...
AFTER CHANGE: http...

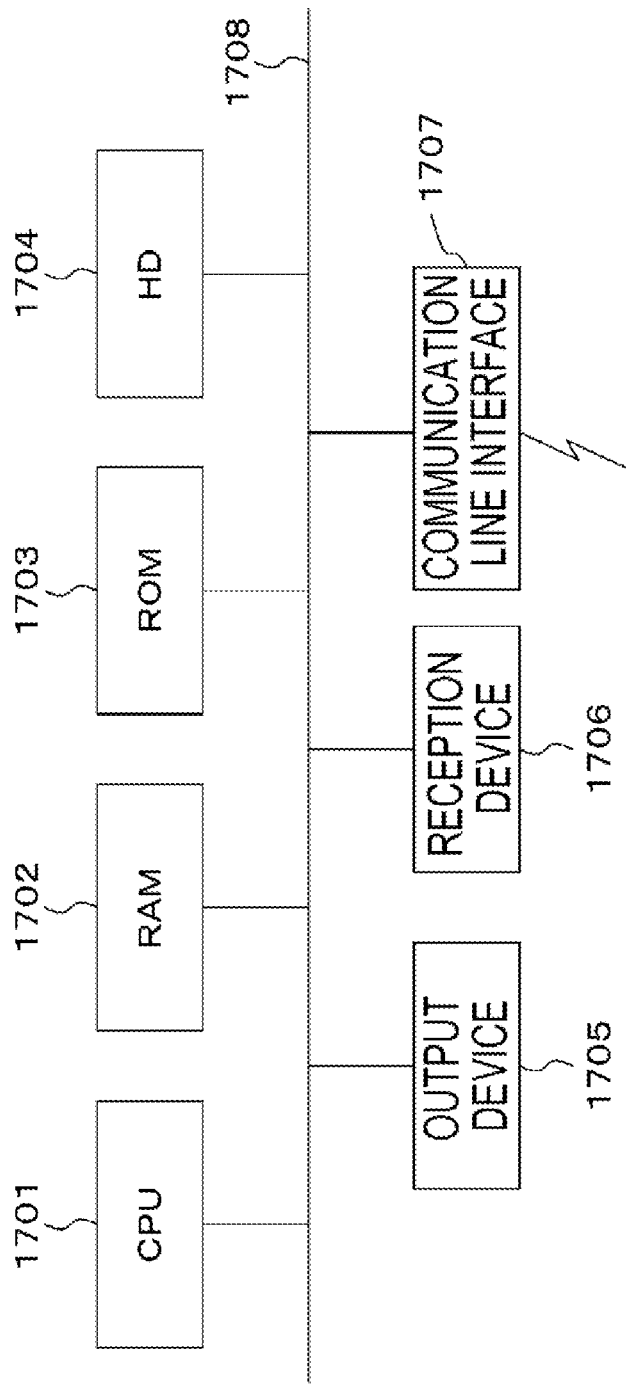

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-226809 filed Nov. 27, 2017.

BACKGROUND

(i) Technical Field

The present invention relates to an information processing apparatus and a non-transitory computer readable medium.

(ii) Related Art

Users exchange messages through, for example, e-mail, chat, or message exchange in SNS. Security measures for messages include, for example, spam filters or security filters.

However, some techniques exist to alter part of a message, such as URL, after a user receives the message. For example, it is possible to replace part of a content with a malicious URL. This allows a malicious message to slip through a spam filter or a security filter for messages and to be transmitted.

SUMMARY

According to an aspect of the invention, an information processing apparatus includes a notification unit that notifies that a received message has changed after reception of the message.

BRIEF DESCRIPTION OF THE DRAWINGS

Exemplary embodiments of the present invention will be described in detail based on the following figures, wherein:

FIG. 16 is an explanatory view illustrating a processing example according to the exemplary embodiment; and FIG. 17 is a block diagram illustrating a hardware configuration example of a computer that implements the exemplary embodiment.

DETAILED DESCRIPTION

Hereinafter, an exemplary embodiment of the present invention will be described with reference to the accompanying drawings.

Figure 1:
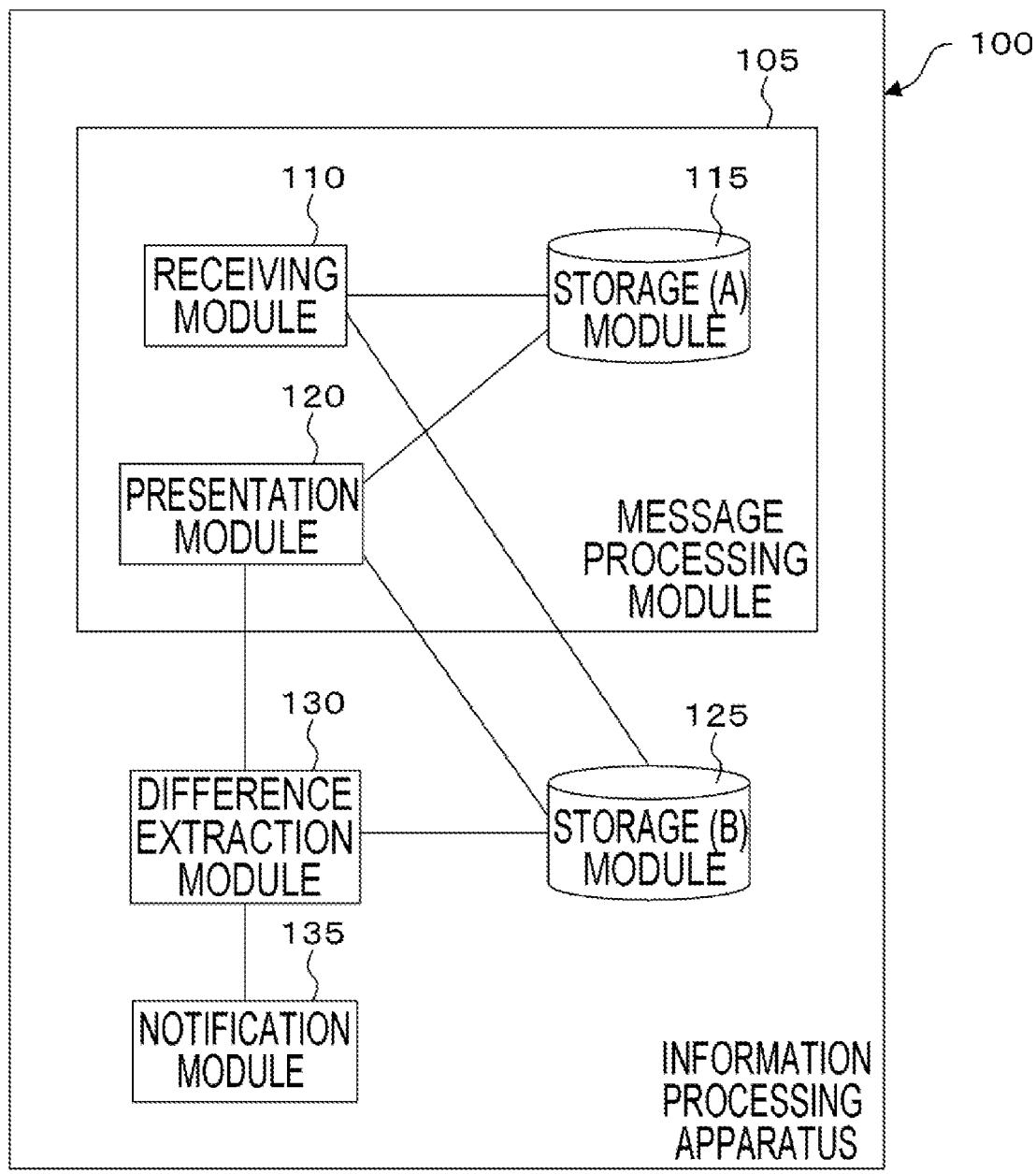
FIG. 1 is a conceptual diagram of a module configuration example according to an exemplary embodiment of the invention.

FIG. 1 is a conceptual diagram of a module configuration example according to an exemplary embodiment of the invention.

As used herein, the term "module" generally refers to a component such as software (computer program) or hardware that may be logically isolated. In the exemplary embodiment, therefore, a module refers to not only a module for a computer program but also a module for a hardware configuration. Therefore, the exemplary embodiment will show all of a computer program, a system, and a method for causing a computer to function as a module (a program for causing a computer to execute each procedure, a program for causing a computer to function as each unit, and a program for causing a computer to implement each function). As used herein, the term "store" or "stored" or an equivalent wording refers to storing a computer program in a storage device or causing a computer program to be stored in a storage device, when the exemplary embodiment is directed to a computer program. In addition, although modules may be in the one-to-one correspondence with functions, for implementation, one module may include one program, or plural modules may include one program, or conversely, one module may include plural programs. Further, plural modules may be executed by one computer, or one module may be executed by plural computers in a distributed or parallel environment. Further, one module may include other modules. As used herein, the term "connection" is intended to include not only physical connection but also logical connection (data exchange, instruction, reference relation between data, log-in, etc.). As used herein, the term "predetermined" refers to a state fixed before a targeted process. Specifically, it is used to include not only a state fixed before a process according to the exemplary embodiment but also a state fixed before a targeted process even after the process according to the exemplary embodiment starts, in which the fixation depends on the situation or state at that time or the situation or state so far. When there are plural "predetermined values", they may be different values or may be two or more same values (of course, including all the values). In addition, the expression "to do B when A" is used to mean "to determine whether A or not and then to do B when A is determined". However, this does not apply to cases where it is unnecessary to determine whether A or not. Further, when objects are listed like "A, B, C", etc., that is a mere list of examples unless otherwise stated, which includes cases where only one of them is selected (e.g., only A).

The term "system" or "apparatus" is intended to include not only a system or apparatus including plural computers, hardware, devices, and so on connected by a communication unit such as a network (including a one-to-one correspondence communication connection), but also a system or apparatus including a single computer, hardware, and so on. The terms "apparatus" and "system" are used exchangeably. Of course, the "system" does not include things that are merely a social "structure" (social system), which is an artificial agreement.

In addition, for each process by each module or for each process when multiple processes are performed in the module, target information is read from a storage device, the process is performed, and then a result of process is written in the storage device. Therefore, the description about reading from the storage device before processing and writing to the storage device after the processing may be omitted in some cases. The storage device used here may include a hard disk, a random access memory (RAM), an external storage medium, a storage device via a communication line, a register in a central processing unit (CPU), and the like.

An information processing apparatus 100 according to the exemplary embodiment receives a message and presents the message. As illustrated in FIG. 1, the information processing apparatus 100 includes a message processing module 105, a storage (B) module 125, a difference extraction module 130 and a notification module 135. Especially, even when the received message has changed (altered), a user is notified of the change.

In the following description, a message refers to data, which is exchanged between plural persons using a communication tool and includes at least a character string. Examples of such a message may include conversation information in e-mails and chatting (including text chatting) and messages being exchanged by a message sending and receiving function in social networking service (SNS), and the like.

For example, when an e-mail is received in a user's e-mail address, a virus check of the e-mail is automatically performed. This virus check is performed by a mail server or a mailer in a user's terminal.

In other words, after the user receives the e-mail (i.e., after the virus check is performed once), it is common that the virus check is not performed again.

However, there are techniques for changing contents, which are safe at the time of receiving the e-mail, to dangerous contents after manipulating them later. An example of the dangerous contents is to change information on a link destination such as uniform resource location (URL) and attract a user to a file or the like storing a virus or the like.

Figure 3A:
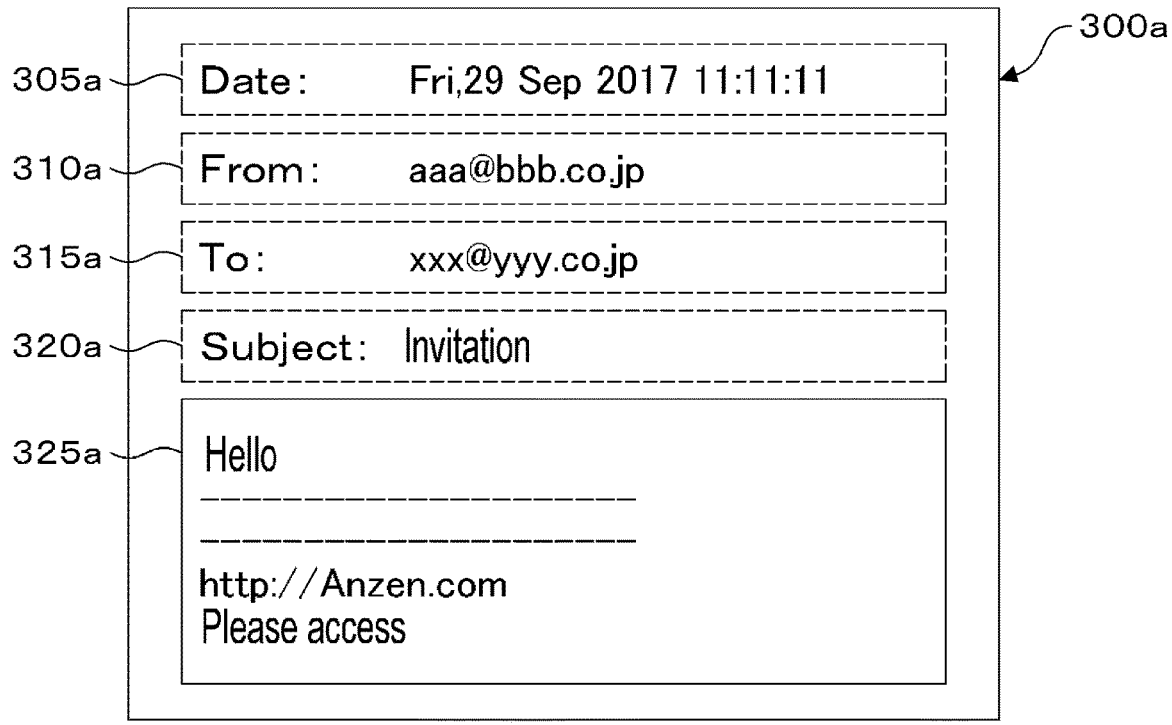
FIGS. 3A and 3B are explanatory views illustrating an example of a case where a received message has changed after reception or browsing of the message.
Figure 3B:
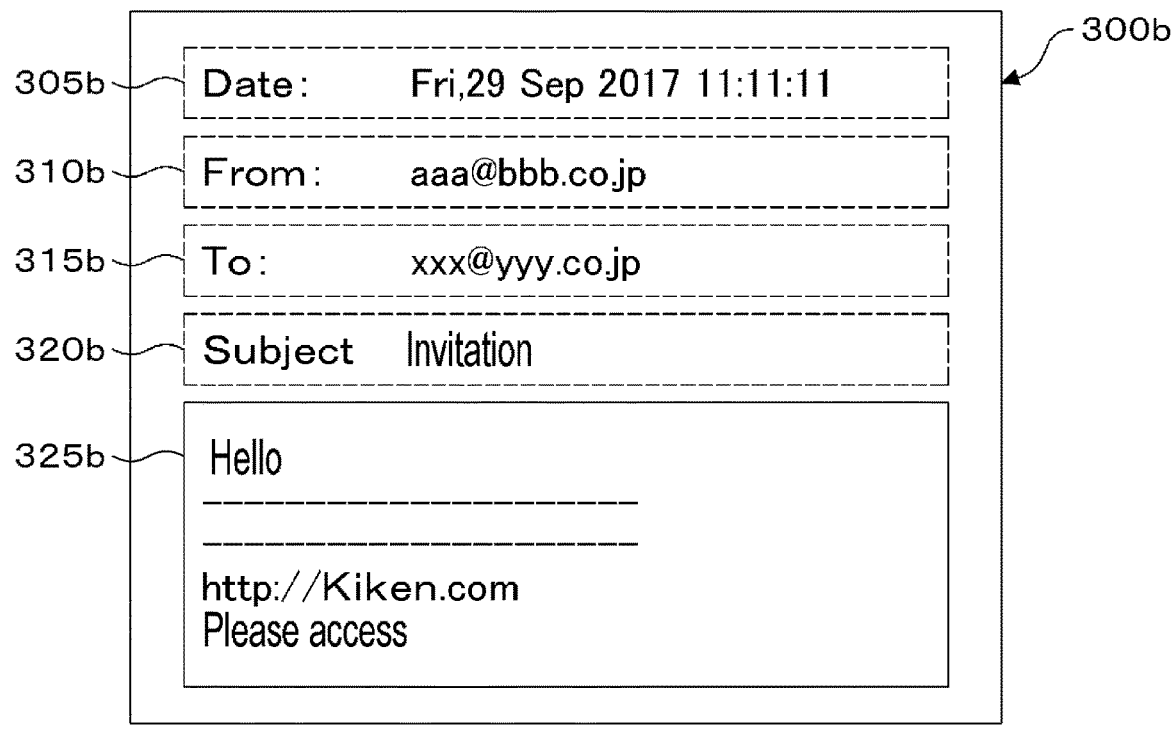

For example, a rewriting in a message is performed as illustrated in FIGS. 3A and 3B. FIGS. 3A and 3B are explanatory views illustrating an example of a case where a received message has changed after reception or browsing of the message.

FIG. 3A illustrates an e-mail displayed immediately after being received (first browsing). A message presentation screen 300a includes a date and time display area 305a, a transmission source display area 310a, a transmission destination display area 315a, a subject display area 320a and a text display area 325a.

For example, "Fri, 29 Sep. 2017 11:11:11" is displayed in the date and time display area 305a, "aaa@bbb.co.jp" is displayed in the transmission source display area 310a, "xxx@yyy.co.jp" is displayed in the transmission destination display area 315a, "invitation" is displayed in the subject display area 320a, and "Hello . . . . Please access http://Anzen.com." is displayed in the text display area 325a. A virus check has been performed on the contents of this e-mail, and there is no problem accessing "http://Anzen.com".

FIG. 3B illustrates an e-mail displayed for the second time. A message presentation screen 300b includes a date and time display area 305b, a transmission source display area 310b, a transmission destination display area 315b, a subject display area 320b, and a text display area 325b.

The date and time display area 305b, the transmission source display area 310b, the transmission destination display area 315b, and the subject display area 320b are the same as the date and time display area 305a, the transmission source display area 310a, the transmission destination display area 315a, and the subject display area 320a of FIG. 3A, respectively.

However, "http://Anzen.com" in the text display area 325a has changed to "http://Kiken.com" which is displayed in the text display area 325b. This is because the cascading style sheets (CSS) is altered after the e-mail is received so that the display is changed in this way. For example, the URL is linked to a fake website and so-called phishing may be conducted. Since the URL has no problem at the first browsing, the user may believe that the same URL is presented at the second browsing, and there is possibility that the user may access the URL.

This problem arises especially in cases where CSS and HTML are abused. Since an e-mail using CSS reads external information, the URL displayed in the e-mail on the recipient's side may be changed from a harmless one to a malicious one by replacing the CSS even after the e-mail arrives at the recipient. The change of the URL illustrated in the example of FIGS. 3A and 3B is implemented by modifying the quotation source CSS after the reception.

Therefore, when the received message has changed, the information processing apparatus 100 warns the user to recognize that the change has occurred.

The message processing module 105 includes a receiving module 110, a storage (A) module 115, and a presentation module 120. The message processing module 105 is a communication tool for exchanging messages and corresponds to a so-called mailer, a message transmitting and receiving unit in SNS, or the like.

The receiving module 110 is connected to the storage (A) module 115 and the storage (B) module 125. The receiving module 110 transmits/receives a message to/from other persons. The received message is stored in the storage (A) module 115. In addition, the receiving module 110 may store the message after reception (particularly, immediately after reception) in the storage (B) module 125.

The storage (A) module 115 is connected to the receiving module 110 and the presentation module 120. The storage (A) module 115 stores the message received by the receiving module 110.

The presentation module 120 is connected to the storage (A) module 115 and the storage (B) module 125. The presentation module 120 presents the message received by the receiving module 110 (or the message stored in the storage (A) module 115) to a user (a recipient of the message). Here, the presentation may include display on a display device such as a liquid crystal display, an output as a three-dimension (3D) image, printing by a printing device such as a printer, an output of voice by an audio output device such as a speaker, vibration, or combinations thereof.

In addition, the presentation module 120 may cause the storage (B) module 125 to store the message in a state present when the message is browsed. In particular, the presentation module 120 may cause the storage (B) module 125 to store the message in a state present when the message is browsed for the first time.

The storage (B) module 125 is connected to the receiving module 110 and the presentation module 120 of the message processing module 105, and the difference extraction module 130. The storage (B) module 125 stores the message after reception. That is, the storage (B) module 125 stores the message before change. Here, the message before change, which is a storage target, is a message after reception (generally, a message immediately after reception).

In addition, the storage (B) module 125 stores the message in a state present when the message is browsed. In particular, the storage (B) module 125 stores the message in a state present when the message is browsed for the first time. That is, the storage (B) module 125 stores the message before change. Here, the message before change, which is a storage target, is a message in a state present when it is browsed (specifically, a message presented at the first browsing).

The message to be stored may include, for example, an HTML file, a CSS file, an image file, a JavaScript® file, a file attached to the message, and the like. In particular, when a file stored in a server is specified in the message, the file may be stored. Alternatively, only the CSS file may be stored.

In addition, the storage (B) module 125 stores at least the identification information of the message and the link destination in the message. The storage (B) module 125 may store only the message identification information of the message and the link destination in the message. That is, since most part of the message is not altered, only the link destination (specifically, only the URL), which may be changed, may be extracted and stored.

It should be noted that the storage (B) module 125 is different and separate from the storage (A) module 115 for presenting a message (the so-called mailer's storage module (A) module 115). However, both of the storage (A) module 115 and the storage (B) module 125 may be included in one storage medium (hard disk or the like). In addition, when the message is stored in the storage (B) module 125, compression or encryption may be performed. In particular, encryption may be performed so that the message cannot be changed from outside.

The difference extraction module 130 is connected to the presentation module 120 of the message processing module 105, the storage (B) module 125 and the notification module 135. The difference extraction module 130 performs a difference extraction processing (comparison processing) between the message presented by the presentation module 120 and the message stored in the storage (B) module 125. In particular, the difference extraction module 130 may perform a difference extraction processing between the message presented after the second time by the presentation module 120 and the message stored in the storage (B) module 125.

The notification module 135 is connected to the difference extraction module 130. When the received message has changed after reception of it, the notification module 135 notifies that the received message has changed. Here, the notification may be a display on a display device such as a liquid crystal display, an output as a three-dimension (3D) video, a printing on a printing device such as a printer, a voice output by an audio output device such as a speaker, vibration, etc.

Further, when the received message has changed after browsing of it, the notification module 135 notifies that the received message has changed.

In this case, the abovementioned message includes a character string for guide to another link destination. This character string is subjected to a change. Then, the notification module 135 disables transfer to the changed link destination. Here, "to disable transfer" may be, for example, to delete the character string itself indicating the link destination, to make it impossible to select the character string, to modify the character string (e.g., into a character string indicating a safe link destination or a character string indicating that a change has occurred), or the like.

In addition, when the message stored in the storage (B) module 125 differs from the message to be currently presented, the notification module 135 notifies that a change has occurred. Here, the "message to be presented" may be a message before presentation (premised on presentation) or may be a message being presented. Specifically, after a message presentation instruction is made, the difference extraction module 130 may perform the difference extraction processing.

In addition, when a change exists in plural messages, the notification module 135 may notify the change by a list. For example, like a warning 1325 illustrated in FIG. 13, a list of changed messages is presented as a warning.

In addition, the notification module 135 may notify that the change has occurred, in association with a position where the message has changed. For example, a warning is presented corresponding to the position of the changed character string, such as a warning 1225 and a warning 1227 illustrated in FIG. 12.

Figure 2:
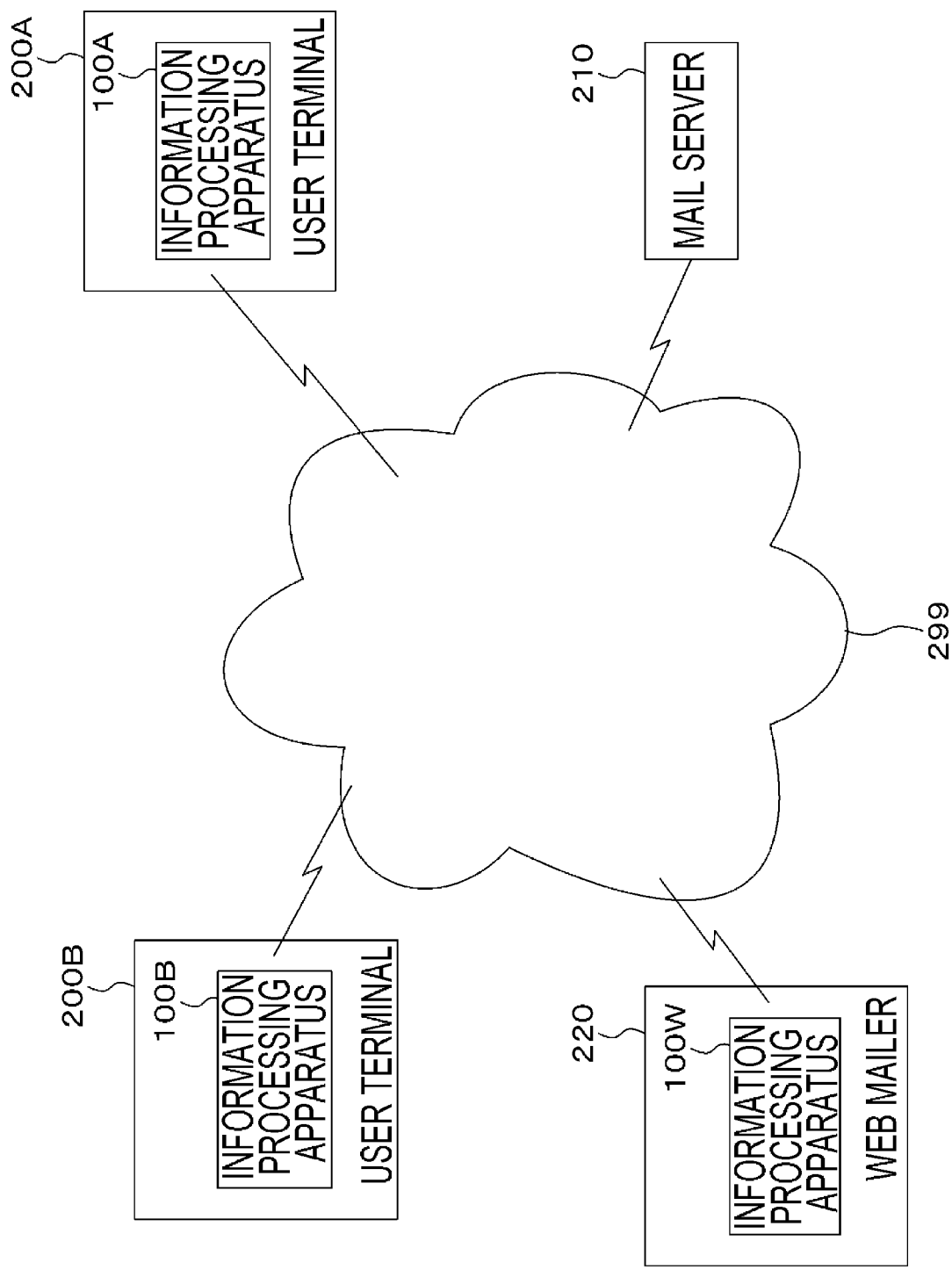
FIG. 2 is an explanatory view illustrating a system configuration example using the exemplary embodiment.

FIG. 2 is an explanatory view illustrating a system configuration example using the exemplary embodiment. This system configuration is an example of an e-mail service.

A user terminal 200A, a user terminal 200B, a mail server 210, and a web mailer 220 are connected via a communication line 299. Examples of the mail server 210 may include an SMTP server, a POP3 server, a DNS server, and the like. The communication line 299 may be wireless, wired, or a combination thereof, and may be, for example, the Internet, an intranet or the like as a communication infrastructure.

The user terminal 200A has an information processing apparatus 100A. The user terminal 200B has an information processing apparatus 100B. Specifically, it is configured that an information processing apparatus 100 is added to a mailer in each user terminal 200 (or an information processing apparatus 100 is incorporated in a mailer). Further, the Web mailer 220 may have an information processing apparatus 100W. In a case of Web mail, since the browser of the user terminal 200 is used to browse an e-mail on the Web mailer 220 which is a mail server, the Web mailer 220 has the information processing apparatus 100W.

When an e-mail is received by a user operation of the user terminal 200 (or when the e-mail is received by the web mailer 220), and when the e-mail is browsed, a processing by the information processing apparatus 100 is performed.

Figure 4:
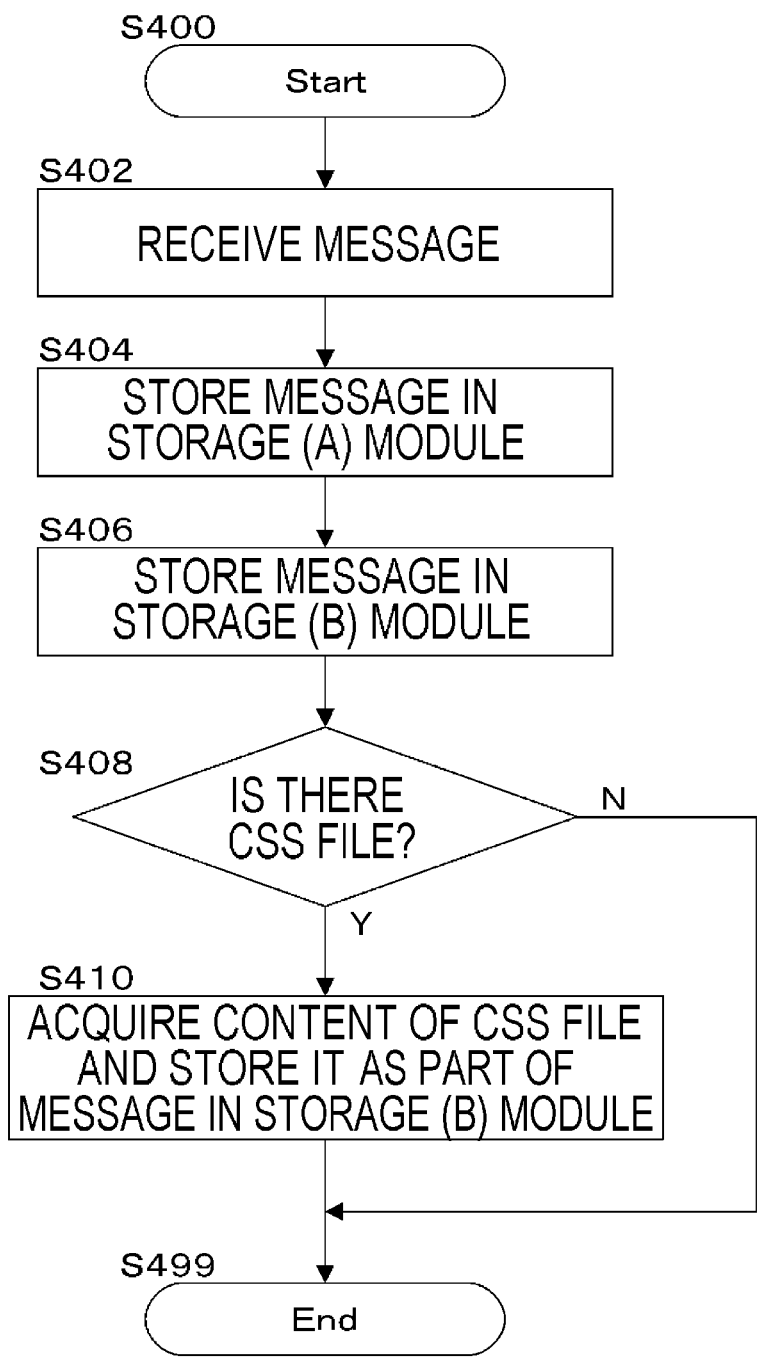
FIG. 4 is a flowchart illustrating a processing example according to the exemplary embodiment.

FIG. 4 is a flowchart illustrating a processing example according to the exemplary embodiment. FIG. 4 illustrates a processing example of storing a message immediately after reception in the storage (B) module 125. It should be noted that this processing may not be performed when storing the message in a first browsed state in the storage (B) module 125. Alternatively, both of the storage of the message immediately after reception in the storing (B) module 125 and the storage of the message in a first browsed state in the storing (B) module 125 may be performed and the difference extraction processing may be performed both between the message currently being presented and the message immediately after reception and between the message currently being presented and the message in a first browsed state.

In step S402, the receiving module 110 receives a message.

In step S404, the receiving module 110 stores the message in the storage (A) module 115. This process is a process generally performed by a mailer.

Figure 5:
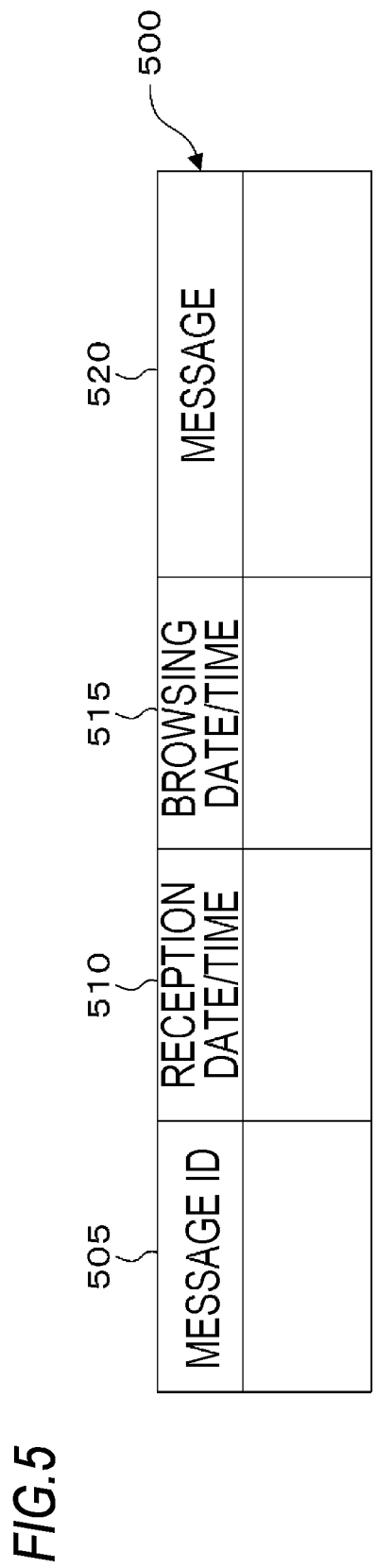
FIG. 5 is an explanatory view illustrating an example of a data structure of a message table.

In step S406, the receiving module 110 stores a message in the storage (B) module 125. For example, a message table 500 is generated in the storage (B) module 125. FIG. 5 is an explanatory view illustrating an example of the data structure of the message table 500. The message table 500 has a message ID column 505, a reception date and time column 510, a browsing date and time column 515 and a message column 520. In the exemplary embodiment, the message ID column 505 stores information (message ID: Identification) for uniquely identifying a message. The reception date and time column 510 stores the reception date and time (year, month, day, hour, minute, second or less, or a combination thereof) of the message. The browsing date and time column 515 stores the browsing date and time of the message. When the message is browsed plural times, there may be plural browsing date and time columns 515. The message column 520 stores a message. The message column 520 may store only a part of the message. For example, when there is only a URL part or when there is no character string of the URL, the message column 520 may store information indicating that fact.

In step S408, the receiving module 110 determines whether or not there is a CSS file in the message. When there is a CSS file, the process proceeds to step S410. Otherwise, the process ends (step S499).

In step S410, the receiving module 110 acquires the contents of the CSS file and stores it as a part of the message in the storage (B) module 125. The contents of the CSS file may be stored in the message column 520 of the message table 500 or may be stored in a CSS column newly provided in the message table 500.

Figure 6:
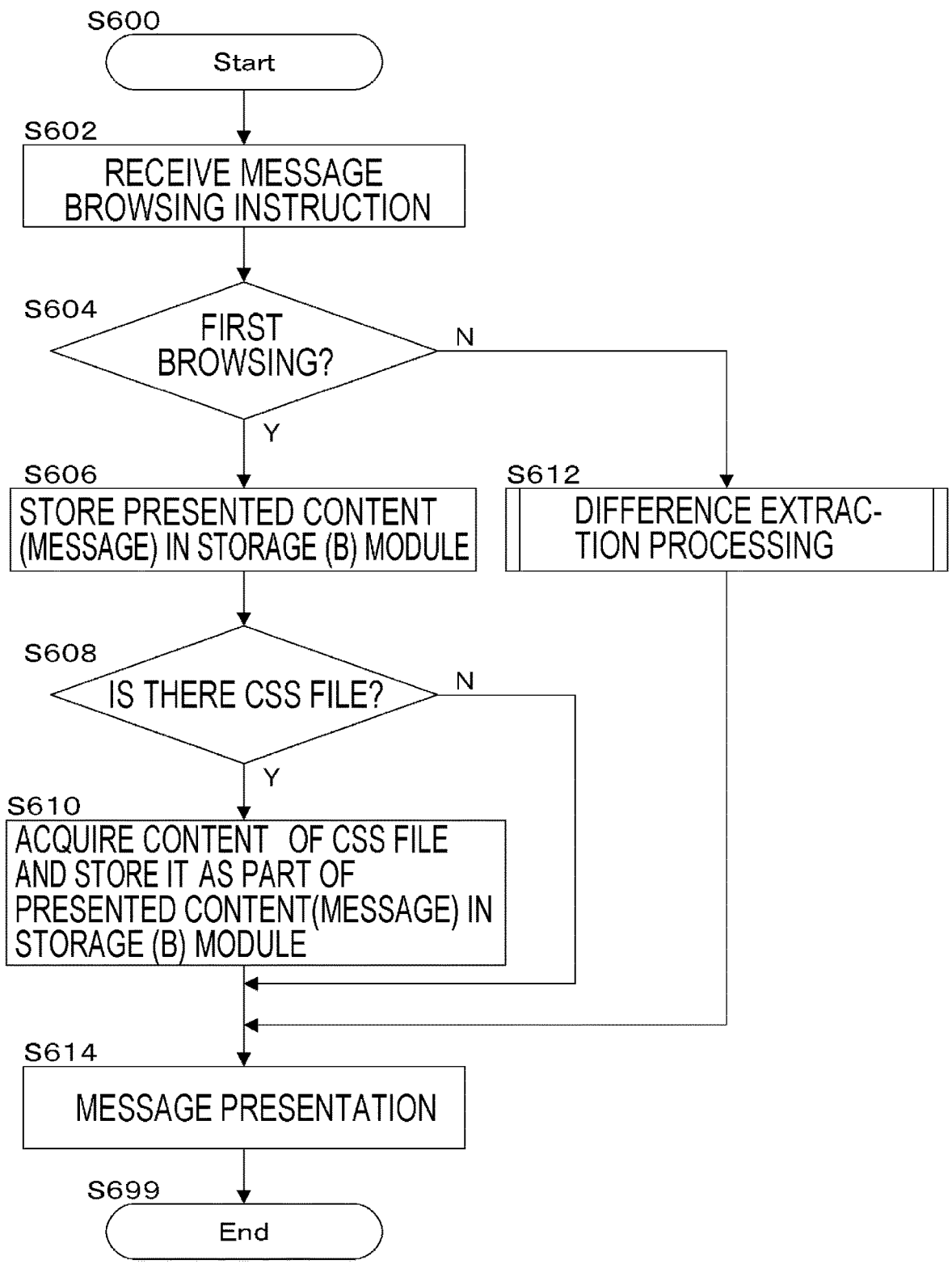
FIG. 6 is a flowchart illustrating a processing example according to the exemplary embodiment.

FIG. 6 is a flowchart illustrating a processing example according to the exemplary embodiment. FIG. 6 illustrates a process of browsing a message.

In step S602, the presentation module 120 receives a message browsing instruction according to the operation of a user.

In step S604, the presentation module 120 determines whether or not the message is browsed for the first time. When the message is browsed for the first time, the process proceeds to step S606. Otherwise, the process proceeds to step S612.

In step S606, the presentation module 120 stores the presented contents (message) in the storage (B) module 125. That is, the presentation module 120 stores the message actually displayed on a screen in the storage (B) module 125.

In step S608, the receiving module 110 determines whether or not there is a CSS file. When there is a CSS file, the process proceeds to step S610. Otherwise, the process proceeds to step S614.

In step S610, the receiving module 110 acquires the contents of the CSS file and stores it as a part of the presented content (message) in the storage (B) module 125.

In step S612, difference extraction processing is performed. The detailed processing of step S612 will be described later with reference to the flowchart illustrated in the example of FIG. 7.

In step S614, the presentation module 120 presents a message.

Figure 7:
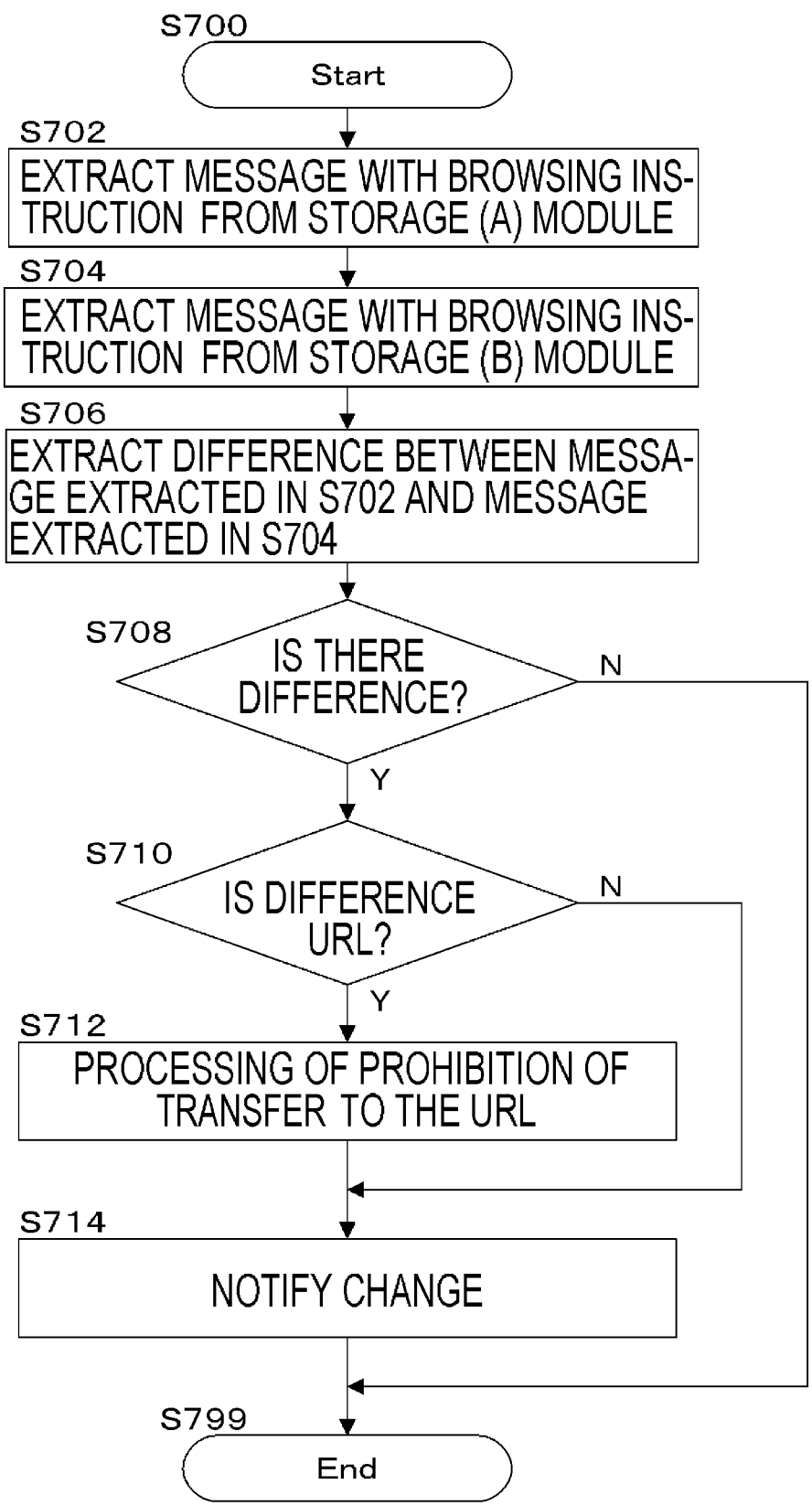
FIG. 7 is a flowchart illustrating a processing example according to the exemplary embodiment.

FIG. 7 is a flowchart illustrating a processing example according to the exemplary embodiment.

In step S702, a message instructed to be read is extracted from the storage (A) module 115.

In step S704, a message instructed to be read is extracted from the storage (B) module 125.

In step S706, a difference between the message extracted in step S702 and the message extracted in step S704 is extracted. An existing technique such as a diff command or the like may be used for the difference extraction processing.

In step S708, it is determined whether or not there is a difference. When there is a difference, the process proceeds to step S710. Otherwise, the process ends (step S799).

In step S710, it is determined whether or not the difference is a URL. When the difference is a URL, the process proceeds to step S712. Otherwise, the process proceeds to step S714.

In step S712, processing of prohibition of movement to the URL is performed. For example, this processing may include deleting a character string of the URL, making it impossible to select the character string of the URL, changing to another URL (secure URL), and the like.

Further, checking the changed URL (e.g., confirming the electronic certificate of the URL, etc.) may be performed. If the URL is problematic, the process of step S712 may be performed.

In step S714, it is notified that there is a change.

Figure 8:
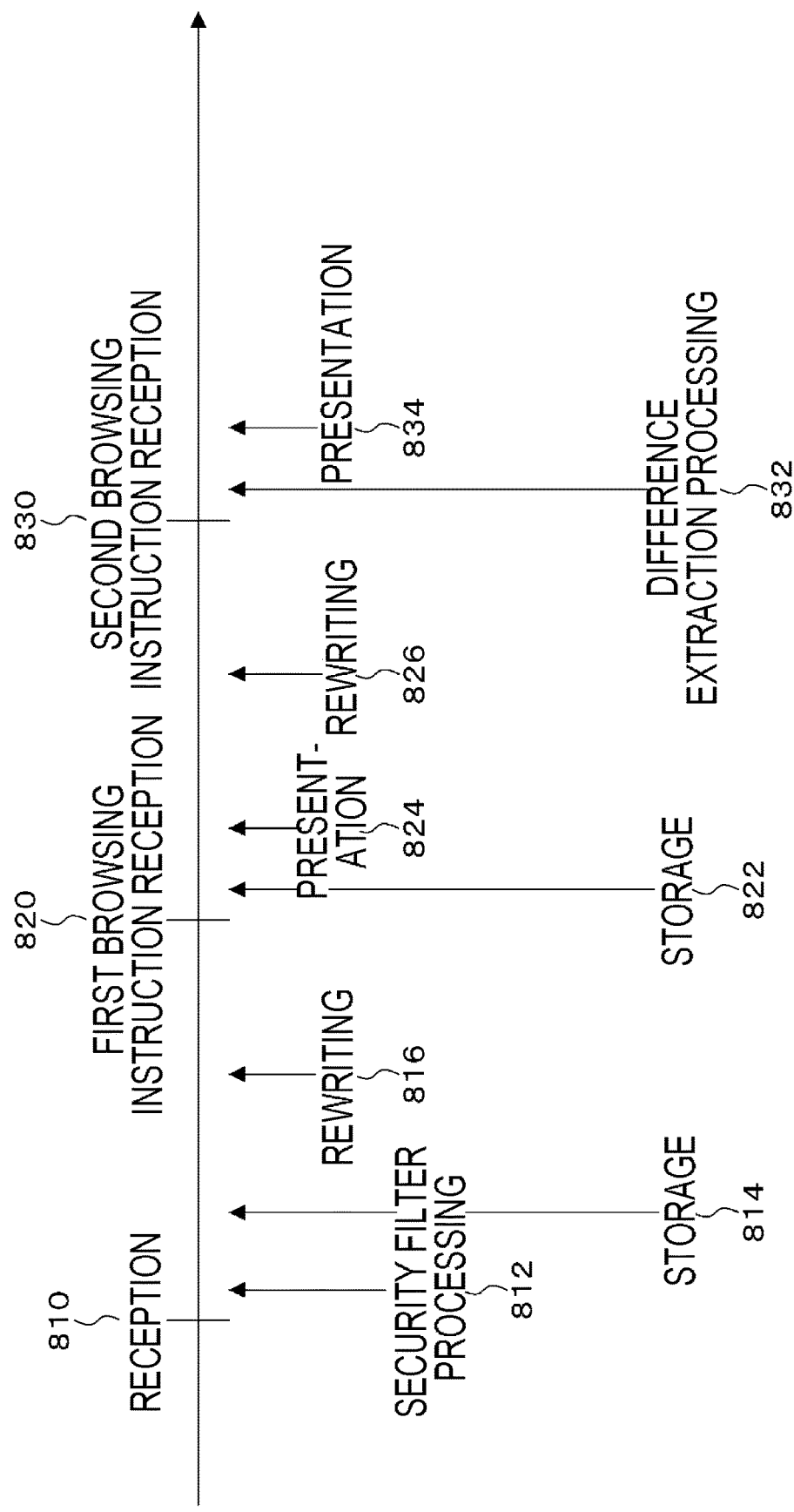
FIG. 8 is an explanatory view illustrating a processing example according to the exemplary embodiment.

FIG. 8 is an explanatory view illustrating a processing example according to the exemplary embodiment. FIG. 8 illustrates a specific processing example according to the flowchart illustrated in FIG. 6. The difference extraction processing by the information processing apparatus 100 is not performed at the first presentation of a message, but is performed at the second and subsequent presentation of the message.

The message is received 810, followed by general security filtering 812, which is stored 814 in the storage (A) module 115 and the storage (B) module 125.

Thereafter, according to the operation of the user, the first browsing instruction reception 820 is performed, the message to be presented is stored 822, and the presentation 824 is performed. It should be noted that the processing of the storage 822 and the processing of the presentation 824 may be reversed. That is, after the presentation 824 is performed, the presented message may be stored 822.

Then, according to the operation of the user, the second browsing instruction reception 830 is performed, the difference extraction processing 832 is performed before the presentation 834, and the message is presented 834 together with the processing result of the difference extraction processing 832.

In this case, when rewriting 826 has occurred between the presentation 824 and the second browsing instruction reception 830, the difference is detected in the difference extraction processing 832, and a warning to that is made in the presentation 834.

In the case of this processing, when rewriting 816 has occurred between the reception 810 and the first browsing instruction reception 820, the rewriting 816 fails to be detected. Therefore, the processing illustrated in the example of FIG. 9 may be performed.

Figure 9:
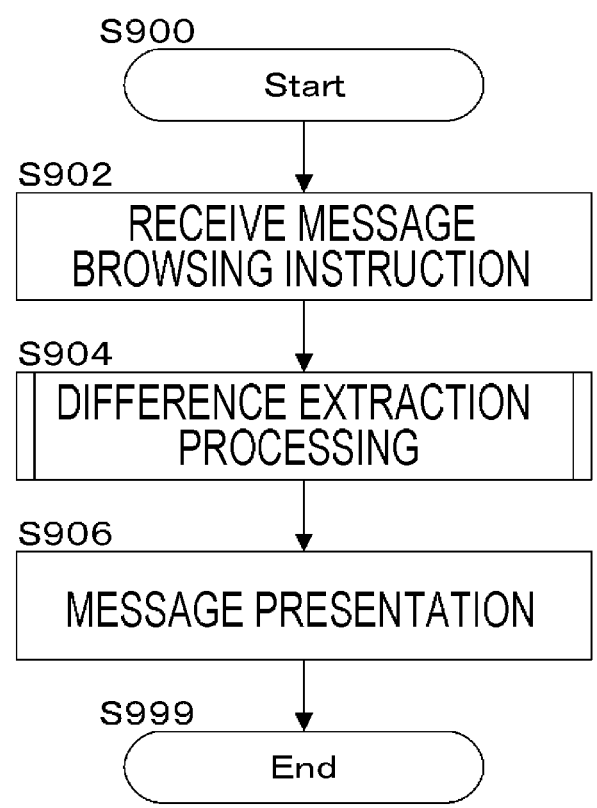
FIG. 9 is a flowchart illustrating a processing example according to the exemplary embodiment.

FIG. 9 is a flowchart illustrating a processing example according to the exemplary embodiment. FIG. 9 illustrates the process illustrated in the example of FIG. 4, which is performed when a message is received.

In step S902, a message browsing instruction is received.

In step S904, difference extraction processing is performed. The detailed process of step S904 has been described above with reference to the flowchart illustrated in the example of FIG. 7. In the processing performed in step S704, a message stored at the time of receiving the message is extracted and the difference extraction processing is performed between the message stored at the time of reception and the message to be currently presented.

In step S906, the message is presented.

Figure 10:
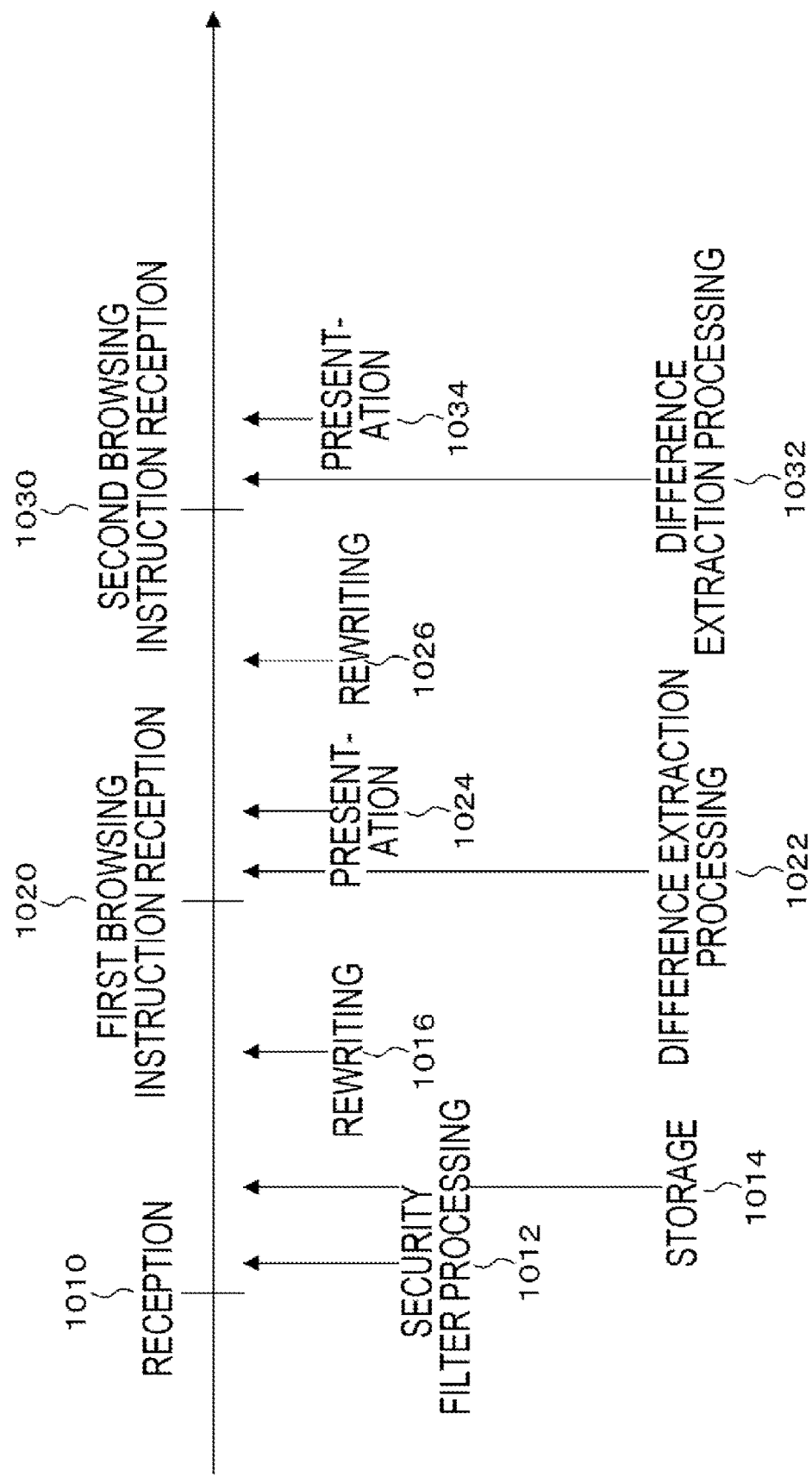
FIG. 10 is an explanatory view illustrating a processing example according to the exemplary embodiment.
Figure 11:
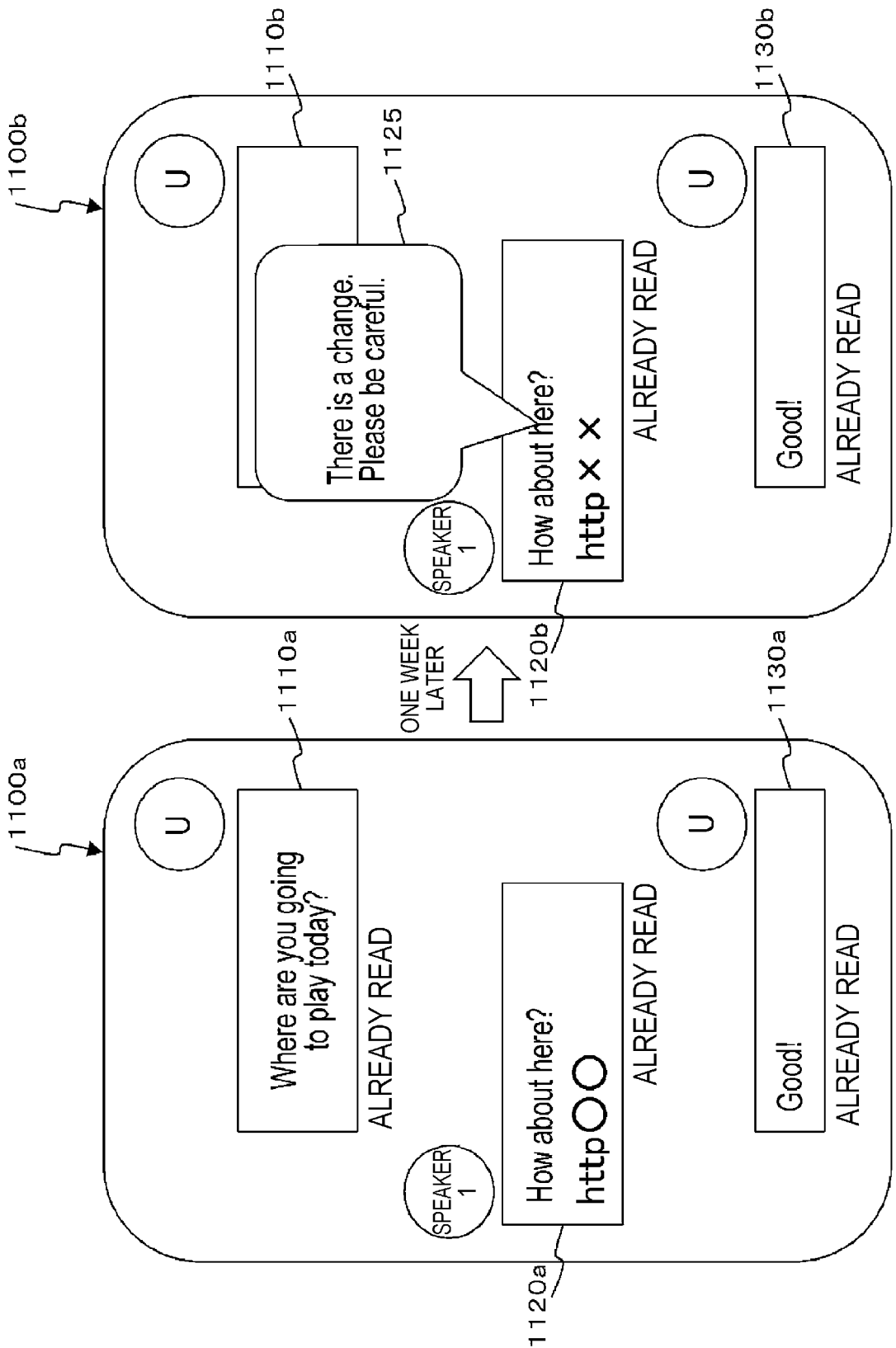
FIGS. 11A and 11B are explanatory views illustrating a processing example according to the exemplary embodiment.

FIG. 10 is an explanatory view illustrating a processing example according to the exemplary embodiment. FIG. 10 illustrates a specific processing example according to the flowchart illustrated in FIG. 9. The difference extraction processing by the information processing apparatus 100 is performed from the time of the first presentation of the message.

The message is received 1010, then general security filtering 1012 is performed and the message is stored 1014 in the storage (A) module 115 and the storage (B) module 125.

Thereafter, according to the operation of the user, the first browsing instruction reception 1020 is performed, the message to be presented is subjected to the difference extraction processing 1022, and the presentation 1024 is performed. It should be noted that the difference extraction processing 1022 and the presentation processing 1024 may be reversed. That is, after the presentation 1024 is performed, the presented message may be subjected to the difference extraction processing 1022.

In this case, when rewriting 1016 has occurred between the storage 1014 and the first browsing instruction reception 1020, the difference is detected in the difference extraction processing 1022, and a warning to that is made in the presentation 1024.

Then, according to the operation of the user, the second browsing instruction reception 1030 is performed, the difference extraction processing 1032 is performed before the presentation 1034, and the message is presented 1034 together with the processing result of the difference extraction processing 1032.

In this case, when rewriting 1026 has occurred between the presentation 1024 and the second browsing instruction reception 1030, the difference is detected in the difference extraction processing 1032, and a warning to that is made in the presentation 1034.

That is, in the case of this processing, both the rewriting 1016 and the rewriting 1026 are detected.

FIGS. 11A and 11B to FIG. 13 illustrate examples of a screen presenting message transmission/reception in SNS.

FIGS. 11A and 11B are explanatory views illustrating a processing example according to the exemplary embodiment.

An example of first presentation of a message is illustrated in the example of FIG. 11A. Specifically, FIG. 11A illustrates an example of conversation between a user and a speaker 1.

A message 1110a from the user, a message 1120a from the speaker 1, and a message 1130a from the user are displayed on a screen 1100a.

An example of second presentation performed for the same message group is illustrated in the example of FIG. 11B. This example corresponds to, for example, (1) a case of closing the message transmission/reception screen in SNS and then again opening the message transmission/reception screen, (2) a case of performing message transmission/reception continuously after the presentation of the example in FIG. 11A, and then scrolling to past messages, etc. When there are a series of messages in such a chatting form, the user may often search for a past URL and then transfer to the URL, and thus it is important to take measures against this change.

A message 1110b, a message 1120b and a message 1130b are displayed on a screen 1100b. The messages 1110b and 1130b are the same as the messages 1110a and 1130a illustrated in the example of FIG. 11A, but the URL in the message 1120b has been changed from "httpOO" to "httpXX". As a result of the difference extraction, a warning 1125 is displayed in the message 1120b. For example, a message "There is a change. Please be careful." is displayed in the warning 1125. In other words, a pop-up or the like is displayed so that the user will be informed of the change. In addition, the link may be invalidated so that transfer to the link destination by misoperation is prevented.

Figure 12:
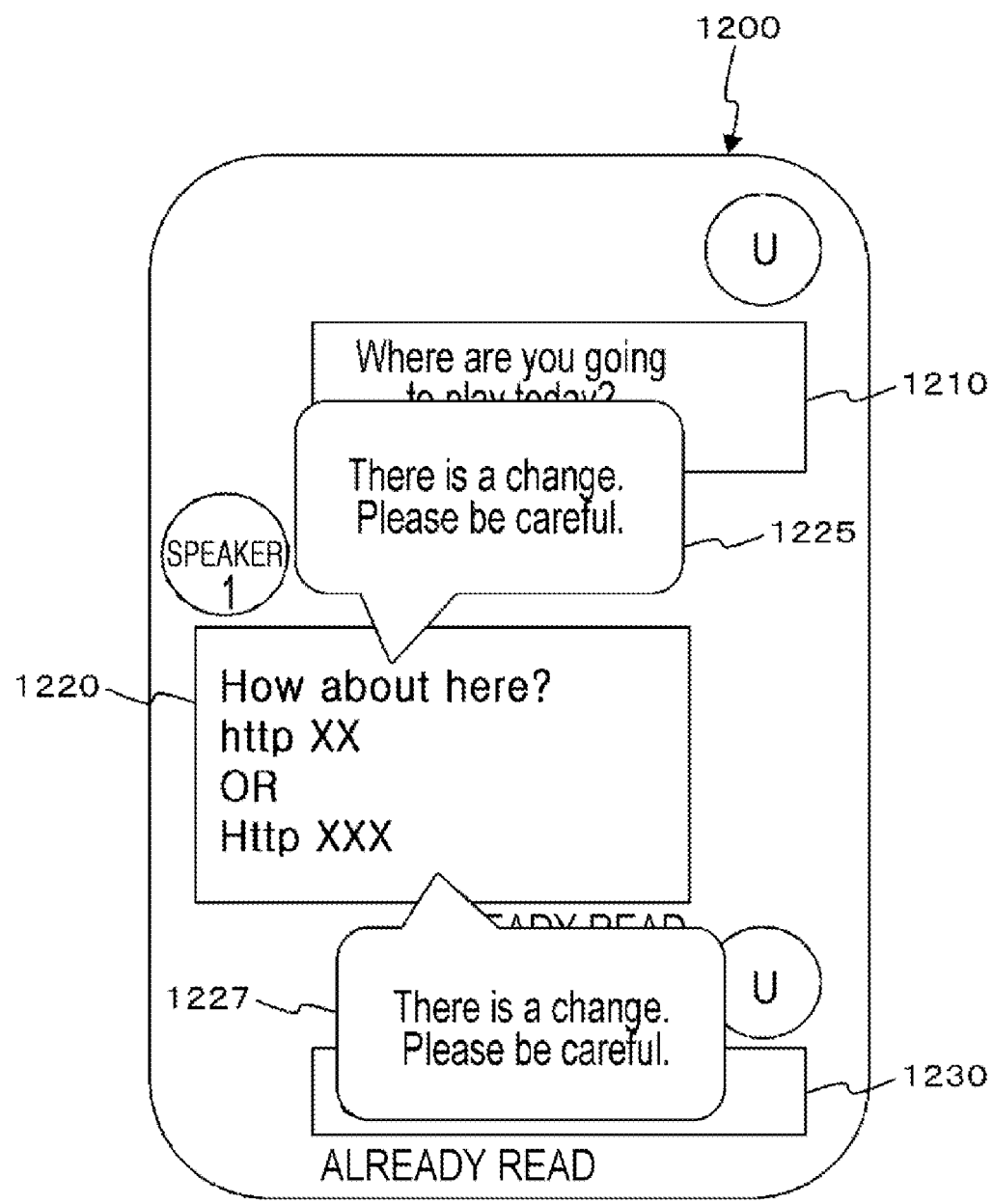
FIG. 12 is an explanatory view illustrating a processing example according to the exemplary embodiment.

FIG. 12 is an explanatory view illustrating a processing example according to the exemplary embodiment. FIG. 12 illustrates an example of notifying the user of a change in association with a changed position in a message.

A message 1210, a message 1220, and a message 1230 are displayed on a screen 1200, and a warning 1225 and a warning 1227 are displayed for the message 1220 in accordance with the position of a changed URL.

For example, a message "There is a change. Please be careful." is displayed in the warning 1225 and the warning 1227.

Figure 13:
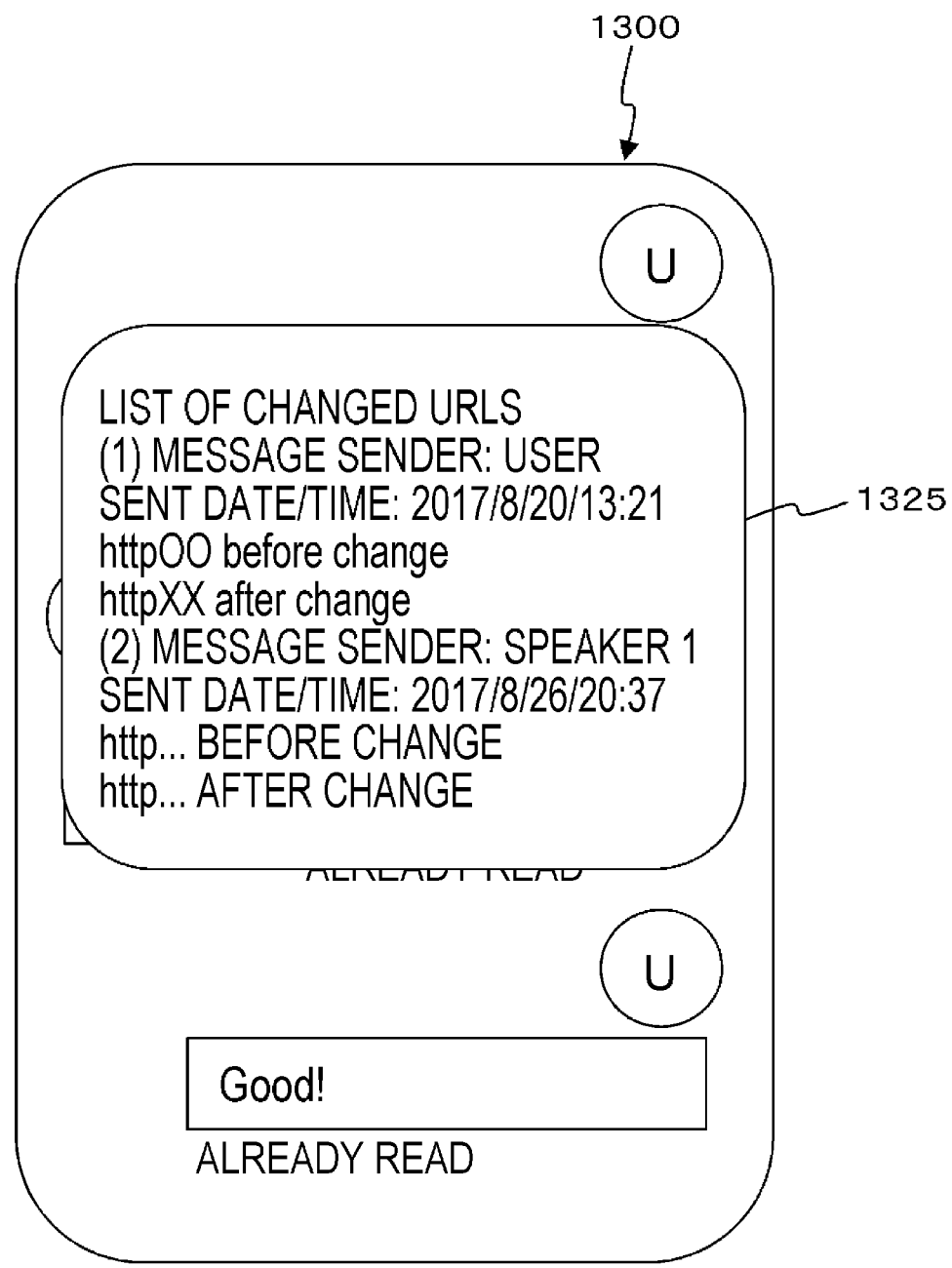
FIG. 13 is an explanatory view illustrating a processing example according to the exemplary embodiment.

FIG. 13 is an explanatory view illustrating a processing example according to the exemplary embodiment. FIG. 13 illustrates an example of notifying a group of changes existing in plural messages by a list.

A message in which a URL has changed is displayed on a screen 1300. A warning 1325 is also displayed on the screen 1300.

For example, the warning 1325 is displayed as follows.
List of Changed URLs
(1) Message sender: user
  Sent date and time: 2017/8/20/13:21
  httpOO before change
  httpXX after change
(2) Message sender: speaker 1
  Sent date and time: 2017/8/26/20:37
  http . . . before change
  http . . . after change FIGS. 14A and 14B to FIG. 16 illustrate examples of a screen presenting e-mail reception by a mailer.

Figure 14A:
FIGS. 14A and 14B are explanatory views illustrating a processing example according to the exemplary embodiment.
Figure 14B:
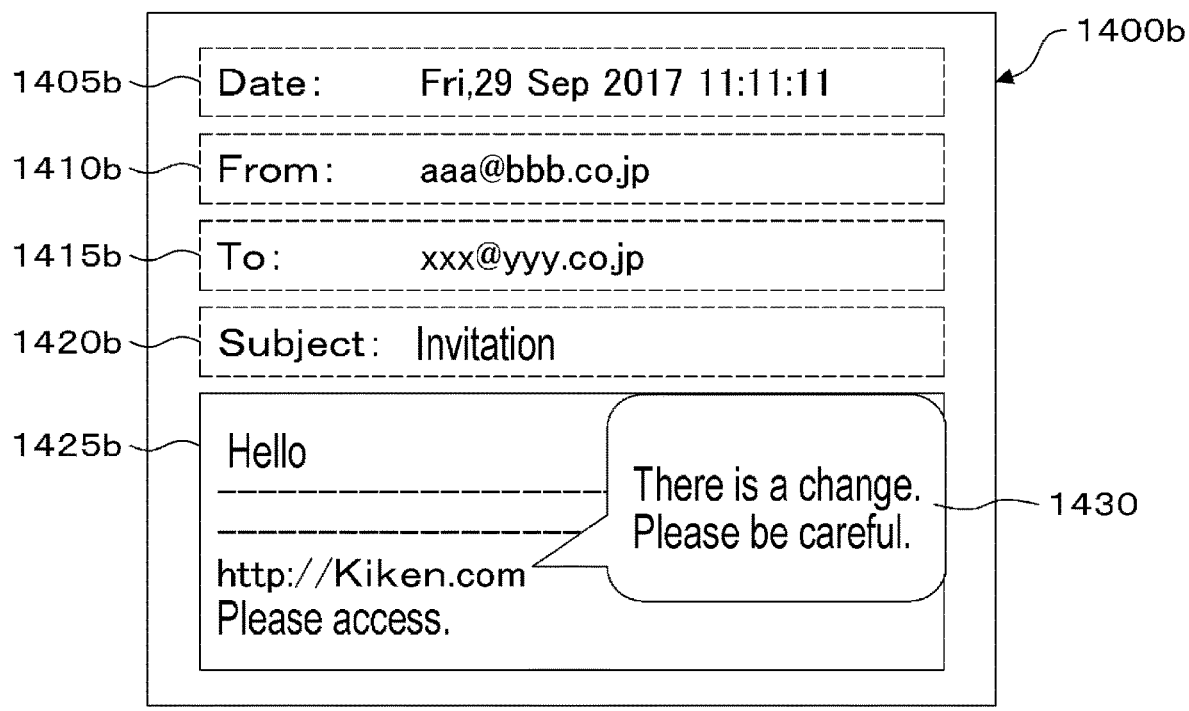

FIGS. 14A and 14B are explanatory views illustrating a processing example according to the exemplary embodiment.

In the example of FIG. 14A, an e-mail is displayed immediately after receiving the e-mail (the first browsing). A date and time display area 1405a, a transmission source display area 1410a, a transmission destination display area 1415a, a subject display area 1420a and a text display area 1425a are displayed on a message presentation screen 1400a, which are equivalent to those illustrated in the example of FIG. 3A. A message "Hello . . . . Please access http://Anzen.com." is displayed in the text display area 1425a. A virus check has been performed on the contents of this e-mail, and there is no problem accessing "http://Anzen.com".

In the example of FIG. 14B, the e-mail is displayed for the second time.

A date and time display area 1405b, a transmission source display area 1410b, a transmission destination display area 1415*b*, a subject display area 1420*b*, and a text display area 1425*b* are displayed on a message presentation screen 1400*b*.

The date and time display area 1405*b*, the transmission source display area 1410*b*, the transmission destination display area 1415*b* and the subject display area 1420*b* are the same as the date and time display area 1405*a*, the transmission source display area 1410*a*, the transmission destination display area 1415*a* and the subject display area 1420*a*, respectively, in FIG. 14A.

However, "http://Anzen.com" in the text display area 1425*a* has changed to http://Kiken.com, which is displayed in the text display area 1425*b*. As a result of the difference extraction, a warning 1430 is displayed. For example, a message "There is a change. Please be careful." is displayed in the warning 1430. In other words, a pop-up or the like is displayed so that the user will be informed of the change. In addition, the link may be invalidated so that transfer to the link destination by misoperation is prevented.

Figure 15:
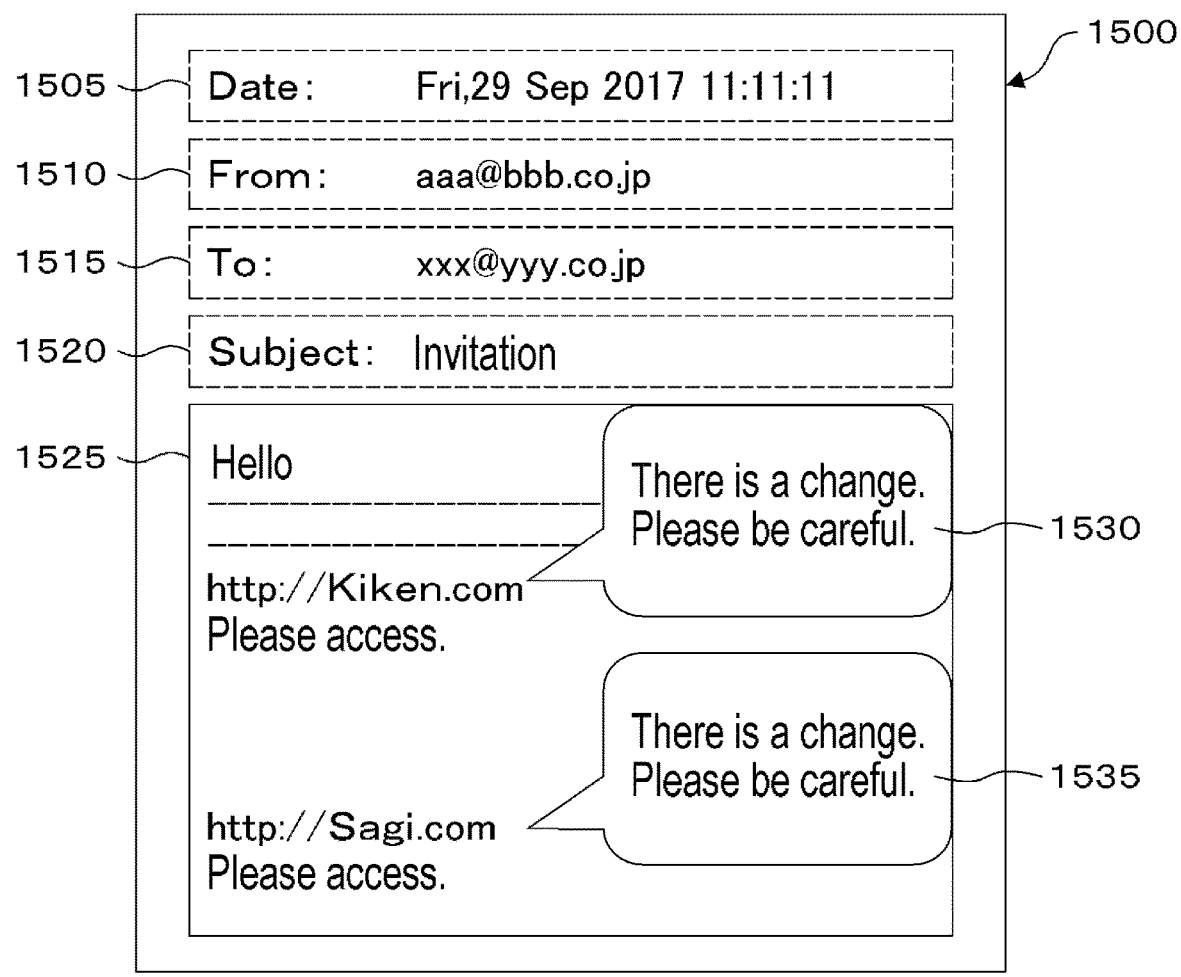
FIG. 15 is an explanatory view illustrating a processing example according to the exemplary embodiment.

FIG. 15 is an explanatory view illustrating a processing example according to the exemplary embodiment. FIG. 15 illustrates an example of notifying the user of a change in association with the changed position in an e-mail.

A date and time display area 1505, a transmission source display area 1510, a transmission destination display area 1515, a subject display area 1520 and a text display area 1525 are displayed on a message presentation screen 1500. A warning 1530 and a warning 1535 are displayed in the text display area 1525 in accordance with the position of a changed URL.

For example, a message "There is a change. Please be careful." is displayed in the warning 1530 and the warning 1535.

FIG. 16 is an explanatory view illustrating a processing example according to the exemplary embodiment. FIG. 16 illustrates an example of notifying a group of changes existing in plural e-mails by a list.

A date and time display area 1605, a transmission source display area 1610, a transmission destination display area 1615, a subject display area 1620 and a text display area 1625 are displayed on a message presentation screen 1600.

For example, a URL that has changed to "Hello . . . . Please access http://Kiken.com." is displayed in the text display area 1625. Then, a warning 1630 is displayed with superimposition on the text display area 1625.

For example, the warning 1630 is displayed as follows.
(1) e-mail sender: aaa@bbb.co.jp
Sent date and time: Fri, 29 Sep. 2017 11:11:11
Before change: http://Anzen.com
After change: http://Kiken.com
(2) e-mail sender: speaker 1
Sent date and time: Sat, 26 Aug. 2017 20:37
Before change: http . . . .
After change: http . . . .

The hardware configuration of a computer on which a program according to the exemplary embodiment is executed is a general-purpose computer, specifically, a personal computer, a computer capable of serving as a server, or the like, as exemplified in FIG. 17. That is, as a specific example, a CPU 1701 is used as a processing unit (arithmetic unit), and a RAM 1702, a ROM 1703 and a HD 1704 are used as storage devices. A hard disk and a solid state drive (SSD) may be used as the HD 1704. The computer includes the CPU 1701 for executing programs for the message processing module 105, the receiving module 110, the presentation module 120, the difference extraction module 130, the notification module 135, etc.; the RAM 1702 that stores the programs and data; the ROM 1703 that stores a program for activating the computer; the HD 1704 which is an auxiliary storage device (which may be a flash memory or the like) having functions as the storage (A) module 115 and the storage (B) module 125; a reception device 1706 for receiving data based on a user operation (including motion, voice, look, etc.) on a keyboard, a mouse, a touch screen, a microphone, a camera (including a look detection camera, etc.), or the like; an output device 1705 such as a CRT, a liquid crystal display, a speaker or the like; a communication line interface 1707 for connecting to a communication network, such as a network interface card; and a bus 1708 for interconnecting these components for data exchange. Plural computers each including such components may be interconnected via a network.

When using a computer program, the above exemplary embodiment is implemented by reading the computer program, which is software, into a system of this hardware configuration and executing software and hardware resources in cooperation.

The hardware configuration illustrated in FIG. 17 is merely one example. The exemplary embodiment is not limited to the configuration illustrated in FIG. 17 but may be implemented with any configuration that may execute the modules shown in the exemplary embodiment. For example, some of the modules may be configured with dedicated hardware (e.g., an application specific integrated circuit (ASIC), etc.), some of the modules may be in an external system and connected via a communication line. Further, plural systems each illustrated in FIG. 17 may be interconnected via a communication line so as to operate in cooperation. Specifically, besides a personal computer, the modules may be installed in a portable information communication device (including a cellular phone, a smartphone, a mobile device, a wearable computer, etc.), an information home appliance, a robot, a copier, a facsimile, a scanner, a printer, a multifunction machine (an image processing apparatus having at least two functions of a scanner, a printer, a facsimile, etc.), or the like.

The program described above may be stored in a recording medium or may be provided by a communication unit. In that case, for example, the program described above may be considered as an invention of "a computer-readable recording medium storing a program".

The "computer-readable recording medium storing a program" refers to a computer-readable recording medium in which the program is recorded and which is for use in installation, execution, distribution or the like of the program.

Examples of the recording medium may include a digital versatile disk (DVD) such as "DVD-R, DVD-RW, DVD-RAM, DVD+R, DVD+RW, etc.", which are standards formulated by the DVD forum, a compact disc (CD) such as CD-ROM, CD recordable (CD-R), or CD rewritable (CD-RW), a Blu-ray® disc, a magnetooptical disc (MO), a flexible disk (FD), a magnetic tape, a hard disk, a read only memory (ROM), an electrically erasable and rewritable read only memory (EEPROM®), a flash memory, a random access memory (RAM), a secure digital (SD) memory card, and the like.

The whole or part of the program may be recorded in the recording medium for storage, distribution or the like. Further, the whole or part of the program may be transmitted by communication using a transmission medium such as a wired network, a wireless communication network or a combination thereof used for a local area network (LAN), a metropolitan area network (MAN), a wide area network (WAN), the Internet, an intranet, an extranet, or the like, or may be carried on a carrier wave.

Further, the program may be a part or the whole of another program, or may be recorded on a recording medium together with a separate program. Further, it may be divided and recorded in plural recording media. Further, it may be recorded in any manner as long as it may be compressed or coded in a restorable manner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory; and
a processor, configured to:
   receive a message;
   store, in the memory, the message and at least a first link destination in the message;
   determine whether the first link destination in the received message stored in the memory is changed to a second link destination prior to the received message has been browsed for the first time; and
   notify a change has occurred with a notification message in response to that the first link destination is changed to the second link destination prior to the received message has been browsed for the first time,
wherein the notification message including the first link destination and the second link destination.

2. The information processing apparatus according to claim 1, wherein
the second link destination includes a character string for guiding to another link destination.

3. The information processing apparatus according to claim 2, wherein
transfer to the second link destination is disabled.

4. The information processing apparatus according to claim 1, wherein
when the change exists in a plurality of presentations of the received messages, the processor notifies the change by a list.

5. The information processing apparatus according to claim 1, wherein
the processor notifies the change in the first link destination in the received message in association with a changed position in the presentation of the received message.

6. The information processing apparatus according to claim 1, wherein
the memory stores the received message upon reception by the information processing apparatus, and
the processor determines whether the received message stored in the memory upon reception differs from the presentation of the received message.

7. The information processing apparatus according to claim 6,
wherein the processor determines whether the received message stored in the memory upon reception differs from the received message displayed on a screen.

8. A non-transitory computer readable medium storing a program causing a computer to execute information processing, the information processing comprising:
   receiving a message;
storing, in a memory, the received message and at least a first link destination in the received message;
   determining whether the first link destination in the received message stored is changed to a second link destination prior to the received message has been browsed for the first time; and
   notifying a change has occurred in response to that the first link destination in the received message is changed to the second link destination prior to the received message has been browsed for the first time,
wherein the notification message includes the first link destination and the second link destination.

* * * * *